United States Patent
Cheng et al.

(10) Patent No.: US 10,167,052 B2
(45) Date of Patent: Jan. 1, 2019

(54) LINEAR GEAR SHIFT MECHANISM FOR CHAINLESS VEHICLE

(71) Applicant: MOTIVE POWER INDUSTRY CO., LTD., Dacun Township (TW)

(72) Inventors: Hsin-Lin Cheng, Dacun Township (TW); Ching-Chung Teng, Dacun Township (TW)

(73) Assignee: MOTIVE POWER INDUSTRY CO., LTD. (TW)

( * ) Notice: Subject to any disclaimer, the term of this patent is extended or adjusted under 35 U.S.C. 154(b) by 597 days.

(21) Appl. No.: 14/883,002

(22) Filed: Oct. 14, 2015

(65) Prior Publication Data

US 2017/0106941 A1 Apr. 20, 2017

(51) Int. Cl.
*F16H 15/28* (2006.01)
*B62M 6/55* (2010.01)
*B62M 11/12* (2006.01)
*B62M 11/10* (2006.01)
*B62M 17/00* (2006.01)

(52) U.S. Cl.
CPC .............. *B62M 6/55* (2013.01); *B62M 11/10* (2013.01); *B62M 11/12* (2013.01); *B62M 17/00* (2013.01); *F16H 15/28* (2013.01)

(58) Field of Classification Search
CPC .......... F16H 15/06; F16H 15/28; B62M 6/55; B62M 11/10; B62M 11/12
USPC ........................................................ 476/38
See application file for complete search history.

(56) References Cited

U.S. PATENT DOCUMENTS

| | | | | | |
|---|---|---|---|---|---|
| 2,860,530 | A | * | 11/1958 | Hine | F16H 15/52 475/190 |
| 3,209,606 | A | * | 10/1965 | Sota | F16H 15/28 476/38 |
| 3,407,687 | A | * | 10/1968 | Tadashi | F16H 15/52 475/189 |
| 9,347,532 | B2 | * | 5/2016 | Versteyhe | F16H 15/40 |
| 9,933,054 | B2 | * | 4/2018 | Cooper | F16H 15/52 |

FOREIGN PATENT DOCUMENTS

JP           59-190557    * 10/1984

\* cited by examiner

*Primary Examiner* — William C Joyce
(74) *Attorney, Agent, or Firm* — Schmeiser, Olsen & Watts, LLP

(57) ABSTRACT

A linear gear shift mechanism for chainless vehicles includes a gear shift unit having a support rotator, transmission balls and driving posts, with the transmission balls disposed in the support rotator, with a cylindrical receiving portion disposed on each transmission ball radially, with the driving posts disposed in the cylindrical receiving portions along radial direction of the support rotator and rotating from radial direction thereof to but not reach axial direction of the support rotator; an axial power input rotator having an inward-tilted power input annular surface; an axial power output rotator having an inward-tilted power output annular surface, with the transmission balls clamped between inward-tilted power input and output annular surfaces and support rotator; a tread-required transverse power source meshing with axial power input rotator; an axial power transfer portion meshing with axial power output rotator axially; a transverse power output portion meshing with axial power transfer portion.

13 Claims, 15 Drawing Sheets

LINEAR GEAR SHIFT MECHANISM FOR CHAINLESS VEHICLE

FIELD OF TECHNOLOGY

The present invention relates to linear gear shift mechanisms for chainless vehicles and more particularly to a linear gear shift mechanism for chainless vehicles, which is structurally simple and compact, has a wide linear gear-changing range, incurs little transmission loss, and never jerks while shifting gear.

BACKGROUND

To adjust speed and tread easily, every tread-required means of transportation nowadays is equipped with a front gear, rear gear, chain and gear shift mechanism. However, the front gear, rear gear, chain and gear shift mechanism are structurally intricate and bulky, have a narrow gear-changing range, incur much transmission loss, and tend to jerk while shifting gear. Therefore, a stepless gear shift mechanism characterized by two grooved wheels operating in conjunction with a V-shaped belt is developed. However, the stepless gear shift mechanism has disadvantages, namely large volume of the grooved wheels and the V-shaped belt, and a narrow gear-changing range. Accordingly, the present invention aims to disclose a linear gear shift mechanism for chainless vehicles, such that the linear gear shift mechanism for chainless vehicles is structurally simple and compact, has a wide linear gear-changing range, incurs little transmission loss, and never jerks while shifting gear.

SUMMARY

In view of the aforesaid drawbacks of the prior art, the inventor of the present invention recognized room for improvement in the prior art and thus conducted extensive researches to therefore develop a linear gear shift mechanism for chainless vehicles, such that the linear gear shift mechanism for chainless vehicles is structurally simple and compact, has a wide linear gear-changing range, incurs little transmission loss, and never jerks while shifting gear.

The present invention provides a linear gear shift mechanism for chainless vehicles, comprising: a gear shift unit having a support rotator, a plurality of transmission balls and a plurality of driving posts, with the transmission balls spaced apart from each other and movably disposed in the support rotator, with a cylindrical receiving portion disposed on each said transmission ball along a radial direction thereof, wherein the driving posts have inward ends movably disposed in the cylindrical receiving portions, respectively, along a radial direction of the support rotator and rotate from the radial direction of the support rotator to but not reach an axial direction of the support rotator; an axial power input rotator having an inward-tilted power input annular surface and inputting power along the axial direction of the support rotator; an axial power output rotator having an inward-tilted power output annular surface and outputting power along the axial direction of the support rotator, wherein the transmission balls are movably clamped between the inward-tilted power input annular surface, the inward-tilted power output annular surface and the support rotator; a tread-required transverse power source for meshing with the axial power input rotator along the radial direction of the support rotator; an axial power transfer portion for meshing with the axial power output rotator along the axial direction of the support rotator; and a transverse power output portion for meshing with the axial power transfer portion along the radial direction of the support rotator.

The linear gear shift mechanism for chainless vehicles further comprises an auxiliary power source for meshing with the tread-required transverse power source.

Regarding the linear gear shift mechanism for chainless vehicles, the auxiliary power source has an auxiliary power bevel gear, and the tread-required transverse power source has a transverse power bevel gear, such that the auxiliary power bevel gear meshes with the transverse power bevel gear.

Regarding the linear gear shift mechanism for chainless vehicles, the auxiliary power source is disposed along the radial direction of the support rotator or along the axial direction of the support rotator.

Regarding the linear gear shift mechanism for chainless vehicles, the axial power input rotator and the axial power output rotator are disposed on two opposite sides of the transmission balls, respectively, to movably clamp the transmission balls between the inward-tilted power input annular surface, the inward-tilted power output annular surface and an outer circumferential surface of the support rotator, with the cylindrical receiving portion being a cylindrical receiving recess, wherein the inward ends of the driving posts are movably disposed in the cylindrical receiving recesses, respectively, along the radial direction of the support rotator, wherein the gear shift unit has a driving ring, wherein outward ends of the driving posts are pivotally connected to the driving ring, and the driving ring moves along the axial direction of the support rotator.

Regarding the linear gear shift mechanism for chainless vehicles, the gear shift unit has a driving screw for penetrating and meshing with the driving ring and at least a guiding rod for movably penetrating the driving ring.

Regarding the linear gear shift mechanism for chainless vehicles, the gear shift unit has a driving ring and a limitator, with a plurality of oblique guide slots disposed on an inward annular surface of the driving ring, wherein the limitator has a plurality of axial limiting through holes surrounding an axis of the support rotator, wherein an axial guide opening and an axial curved guide slot are disposed on a radial outward side and a radial inward side of each axial limiting through hole, respectively, wherein the driving ring are movably disposed outside the limitator, wherein the transmission balls are movably confined to the axial limiting through holes, respectively, wherein two opposite sides of the transmission balls are exposed from two opposite sides of the axial limiting through holes, wherein the cylindrical receiving portions are each a cylindrical receiving channel, wherein the inward ends of the driving posts movably penetrate the cylindrical receiving channels along the radial direction of the support rotator so as to be movably disposed in the axial curved guide slots, respectively, wherein the outward ends of the driving posts are movably disposed in the oblique guide slots through the axial guide openings, respectively, wherein the axial power input rotator and the axial power output rotator are positioned on a same side of the transmission balls, wherein the support rotator is positioned beside the transmission balls in a manner to be opposite to the axial power input rotator and the axial power output rotator, such that the transmission balls are movably clamped between the inward-tilted power input annular surface, the inward-tilted power output annular surface and a lateral annular surface of the support rotator, thereby allowing the driving ring to rotate about the limitator by the axis of the support rotator.

Regarding the linear gear shift mechanism for chainless vehicles, the gear shift unit has a driving ring, and the cylindrical receiving portions are each a cylindrical receiving recess, wherein the inward ends of the driving posts are movably disposed in the cylindrical receiving recesses, respectively, along the radial direction of the support rotator, wherein the outward ends of the driving posts are pivotally connected to the driving ring, wherein the axial power input rotator and the axial power output rotator are positioned on a same side of the transmission balls, wherein the support rotator is positioned beside the transmission balls in a manner to be opposite to the axial power input rotator and the axial power output rotator, such that the transmission balls are movably clamped between the inward-tilted power input annular surface, the inward-tilted power output annular surface and a lateral annular surface of the support rotator, thereby allowing the driving ring to move along the axial direction of the support rotator.

Regarding the linear gear shift mechanism for chainless vehicles, the tread-required transverse power source has a transverse power bevel gear, and the axial power input rotator has an axial power input bevel gear, such that the transverse power bevel gear meshes with the axial power input bevel gear.

Regarding the linear gear shift mechanism for chainless vehicles, the axial power output rotator has an axial power output spur gear, and the axial power transfer portion has an axial power transfer spur gear, such that the axial power output spur gear meshes with the axial power transfer spur gear.

The linear gear shift mechanism for chainless vehicles further comprises a spur gear whereby the axial power output spur gear meshes with the axial power transfer spur gear.

Regarding the linear gear shift mechanism for chainless vehicles, the transverse power output portion has a transverse power output bevel gear, and the axial power transfer portion has an axial power transfer bevel gear, such that the transverse power output bevel gear meshes with the axial power transfer bevel gear.

Therefore, the linear gear shift mechanism for chainless vehicles according to the present invention is structurally simple and compact, has a wide linear gear-changing range, incurs little transmission loss, and never jerks while shifting gear.

BRIEF DESCRIPTION

Objectives, features, and advantages of the present invention are hereunder illustrated with specific embodiments in conjunction with the accompanying drawings, in which.

DETAILED DESCRIPTION

Figure 3:
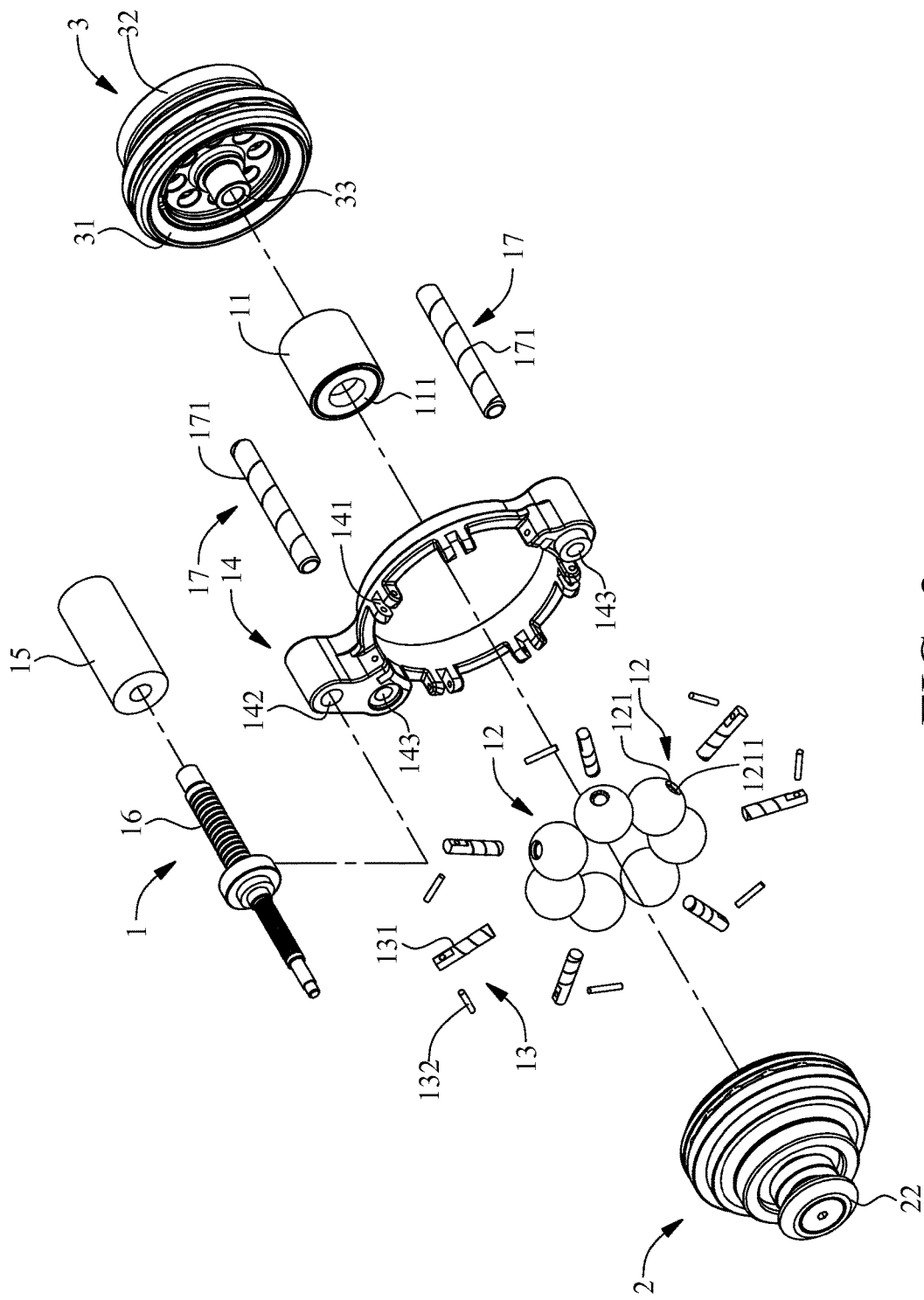
FIG. 3 is an exploded view of an axial power input rotator, gear shift unit and axial power output rotator according to a preferred embodiment of the present invention.
Figure 4:
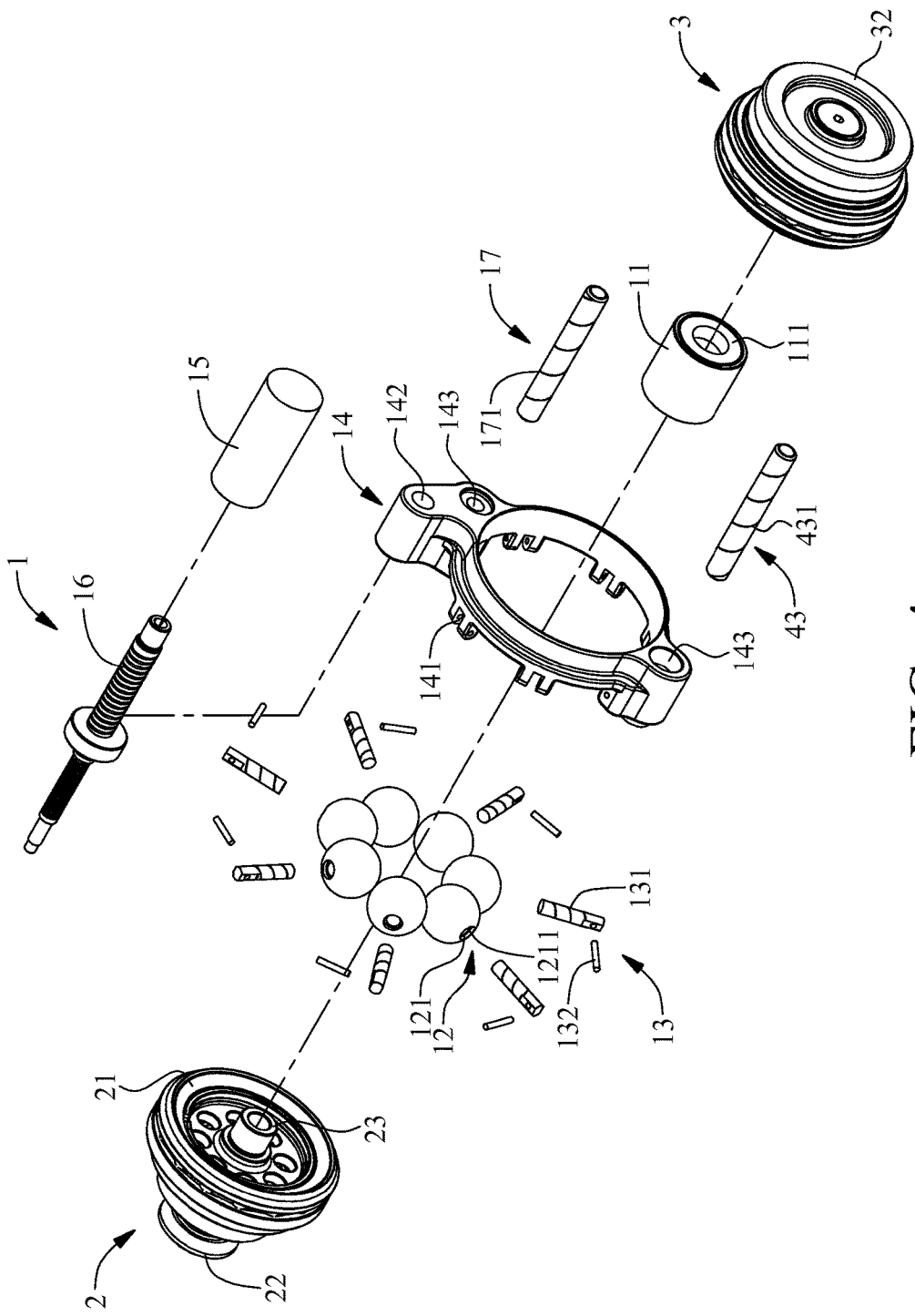
FIG. 4 is an exploded view of the axial power input rotator, gear shift unit and axial power output rotator according to a preferred embodiment of the present invention from another angle of view.
Figure 5:
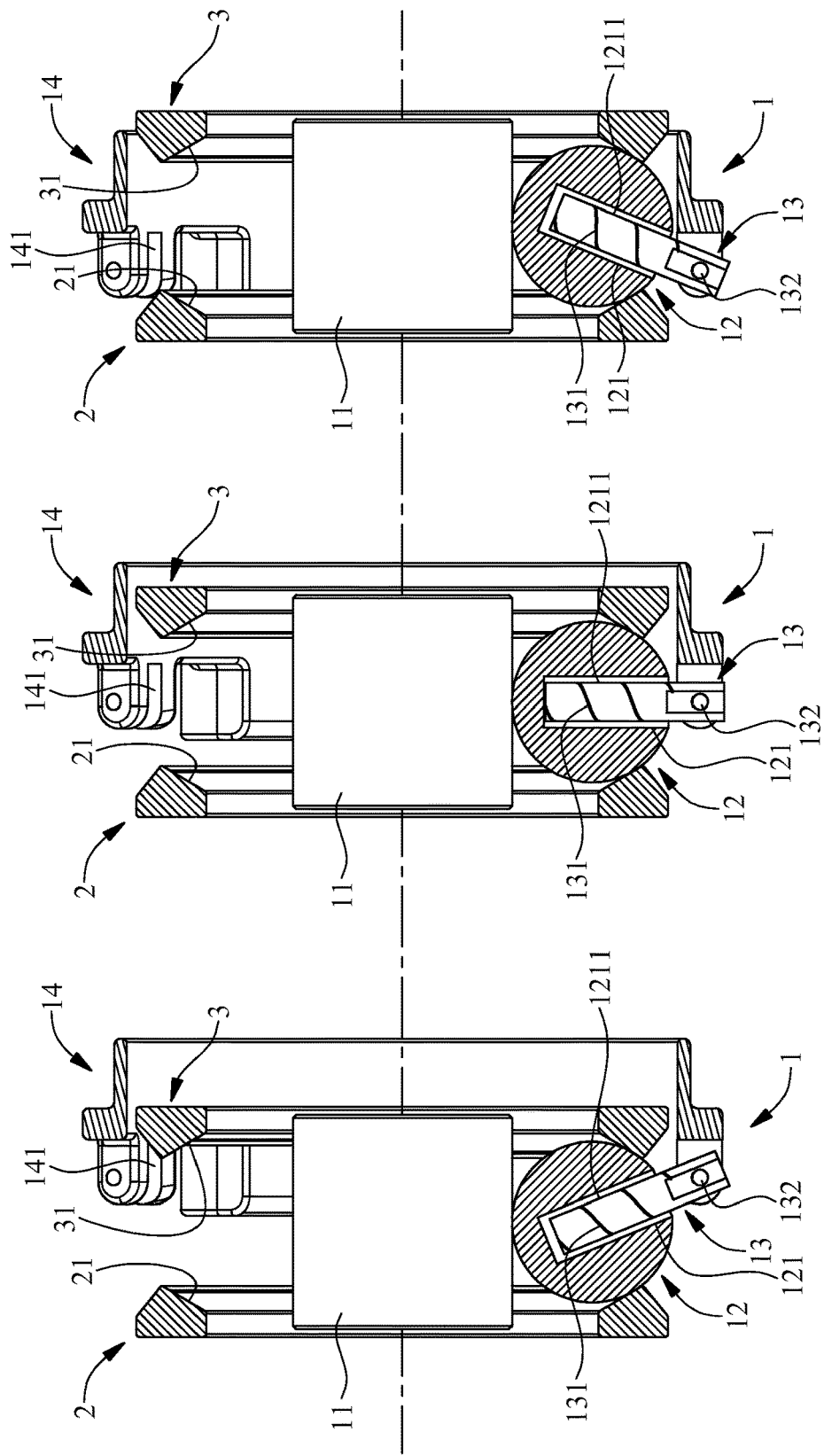
FIG. 5 is a cross-sectional schematic view of the gear shift unit according to a preferred embodiment of the present invention.
Figure 10:
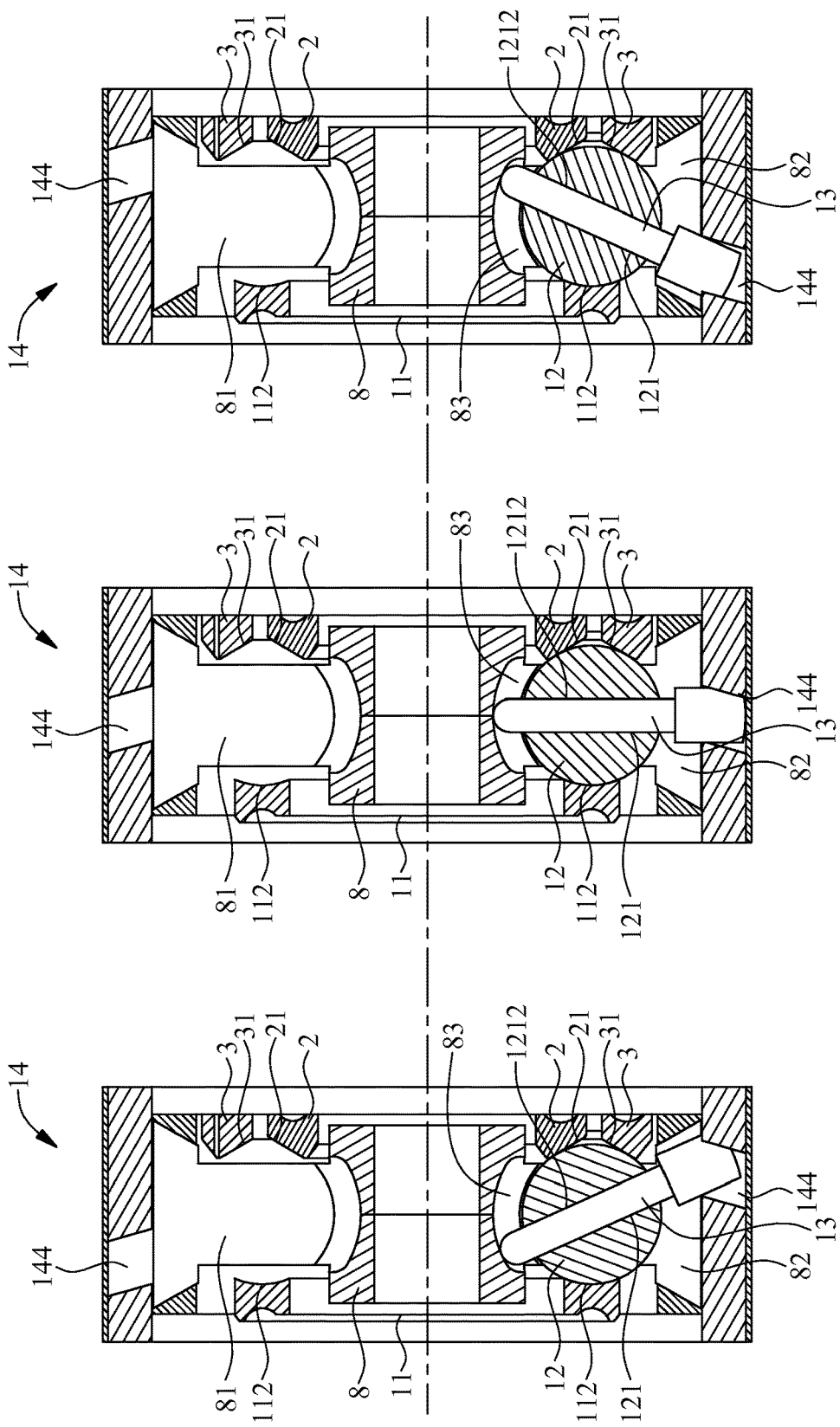
FIG. 10 is a cross-sectional schematic view of another gear shift unit according to a preferred embodiment of the present invention.

Referring to FIG. 1 through FIG. 14, to illustrate how transmission balls 12 and driving posts 13 operate, FIG. 5 and FIG. 10 show only how a transmission ball 12 and a driving post 13 operate, because the other transmission balls and driving posts also operate in the way shown in FIG. 5 and FIG. 10. The present invention provides a linear gear shift mechanism for chainless vehicles, which comprises a gear shift unit 1, an axial power input rotator 2, an axial power output rotator 3, a tread-required transverse power source 4, an axial power transfer portion 5 and a transverse power output portion 6. The gear shift unit 1 has a support rotator 11, a plurality of transmission balls 12 and a plurality of driving posts 13. The transmission balls 12 are spaced apart from each other by the same angle of circumference and movably disposed on the outer circumferential surface (shown in FIG. 5) or a lateral annular surface 112 (shown in FIG. 10) of the support rotator 11. The lateral annular surface 112 is concaved and curved to thereby operate in conjunction with the transmission balls 12. A cylindrical receiving portion 121 is disposed on each transmission ball 12 along the radial direction thereof. The inward ends of the driving posts 13 are movably disposed in the cylindrical receiving portions 121, respectively, along the radial direction of the support rotator 11. A first oil-guiding groove 131 is disposed on the circumferential surface of each driving post 13, such that a lubricant can be disposed between the driving posts 13 and the transmission balls 12 to reduce friction-induced loss. Referring to FIG. 5, the driving posts 13 rotate clockwise or counterclockwise from the radial direction of the support rotator 11 to but not reach the axial direction of the support rotator 11, so as to drive the transmission balls 12 to rotate clockwise or rotate counterclockwise, so do the other driving posts and transmission balls not shown. Referring to FIG. 3 through FIG. 5, the axial power input rotator 2 is laterally provided with an inward-tilted power input annular surface 21 and a first connection shaft 23, and the axial power input rotator 2 inputs power along the axial direction of the support rotator 11, wherein the first connection shaft 23 of the axial power input rotator 2 is pivotally connected to a bearing 111 disposed beside the support rotator 11. Referring to FIG. 6 through FIG. 10, the axial power input rotator 2 is laterally provided with an inward-tilted power input annular surface 21 and an axial power input shaft 24, and the axial power input rotator 2 inputs power along the axial direction of the support rotator 11, wherein an axial power input shaft 24 of the axial power input rotator 2 penetrates the support rotator 11. Referring to FIG. 3 through FIG. 5, the axial power output rotator 3 is laterally provided with an inward-tilted power output annular surface 31 and a second connection shaft 33, and the axial power output rotator 3 outputs power along the axial direction of the support rotator 11, wherein the second connection shaft 33 of the axial power output rotator 3 is pivotally connected to another bearing 111 disposed on the other side of the support rotator 11. Referring to FIG. 6 through FIG. 10, the axial power output rotator 3 is provided with and flanked by an inward-tilted power output annular surface 31 and an axial power output shaft 34, wherein the axial power output rotator 3 outputs power along the axial direction of the support rotator 11. Referring to FIG. 5, the transmission balls 12 are movably clamped between the inward-tilted power input annular surface 21, the inward-tilted power output annular surface 31 and the outer circumferential surface of the support rotator 11, so are the other transmission balls not shown, wherein the axial power input rotator 2 and the axial power output rotator 3 rotate in opposite directions. Referring to FIG. 10, the transmission balls 12 are movably clamped between the inward-tilted power input annular surface 21, the inward-tilted power output annular surface 31 and the lateral annular surface 112 of the support rotator 11, so are the other transmission balls not shown, wherein the axial power input rotator 2 and the axial power output rotator 3 rotate in the same direction. The tread-required transverse power source 4 meshes with the axial power input rotator 2 along the radial direction of the support rotator 11, wherein the tread-required transverse power source 4 is attributed to a power produced as a result of a tread carried out by a human being. The axial power transfer portion 5 meshes with the axial power output rotator 3 along the axial direction of the support rotator 11 and transfers power along the axial direction of the support rotator 11. The transverse power output portion 6 meshes with the axial power transfer portion 5 along the radial direction of the support rotator 11. Therefore, the axial power transfer portion 5 transfers the power from the tread-required transverse power source 4 to the transverse power output portion 6, thereby dispensing with any chain.

Figure 1:
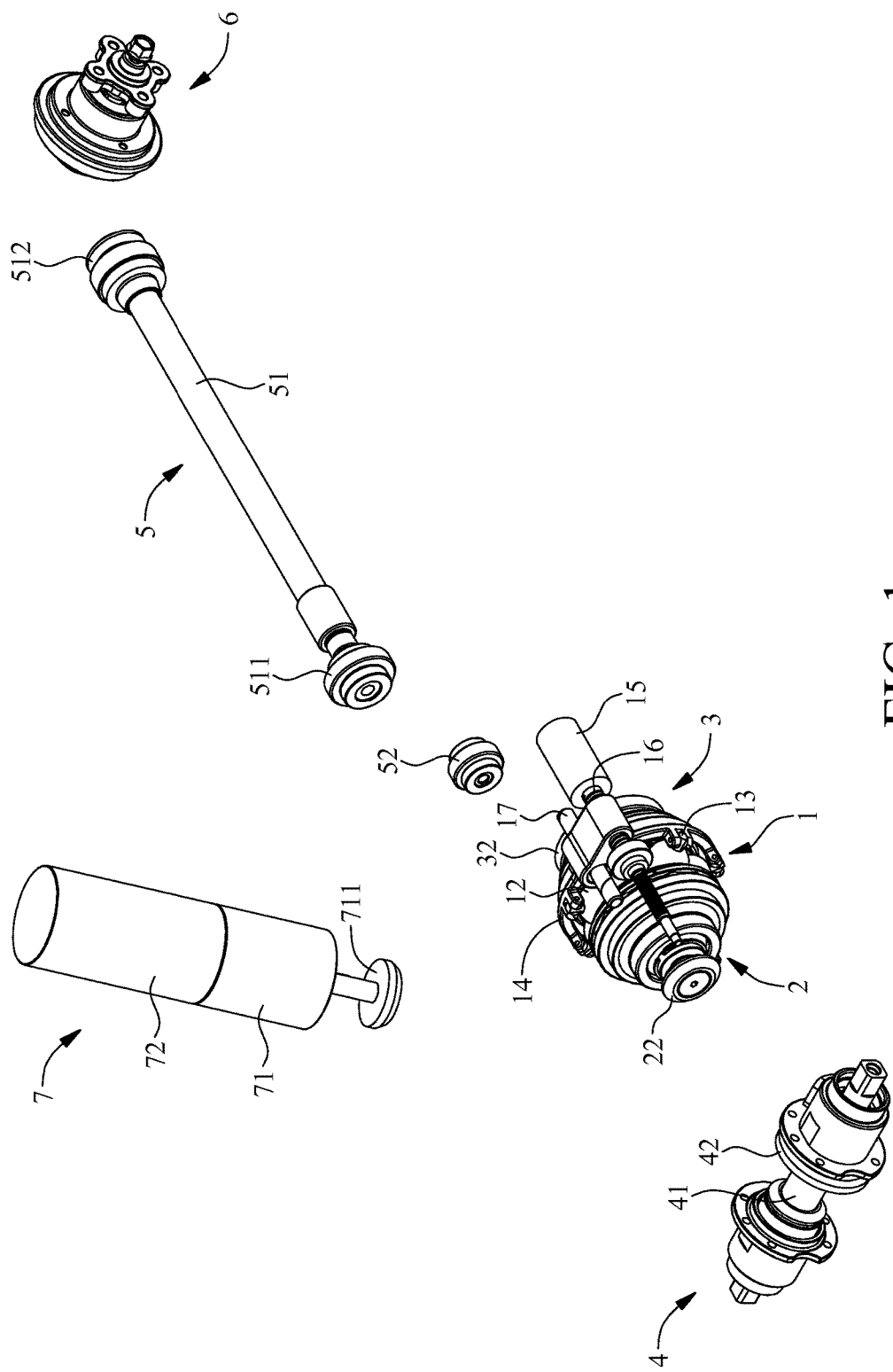
FIG. 1 is an exploded view of a preferred embodiment of the present invention.

Referring to FIG. 1 and FIG. 3, treading the tread-required transverse power source 4 clockwise and thus rotating the axial power input rotator 2 clockwise causes the transmission balls 12 to be driven by the inward-tilted power input annular surface 21 (shown in FIG. 4) of the axial power input rotator 2 to rotate counterclockwise and causes the inward-tilted power output annular surface 31 of the axial power output rotator 3 and the axial power output rotator 3 to be driven by the transmission balls 12 to rotate counterclockwise. Treading the tread-required transverse power source 4 counterclockwise and thus rotating the axial power input rotator 2 counterclockwise causes the transmission balls 12 to be driven by the inward-tilted power input annular surface 21 (shown in FIG. 4) of the axial power input rotator 2 to rotate clockwise and causes the inward-tilted power output annular surface 31 of the axial power output rotator 3 and the axial power output rotator 3 to be driven by the transmission balls 12 to rotate clockwise.

Figure 6:
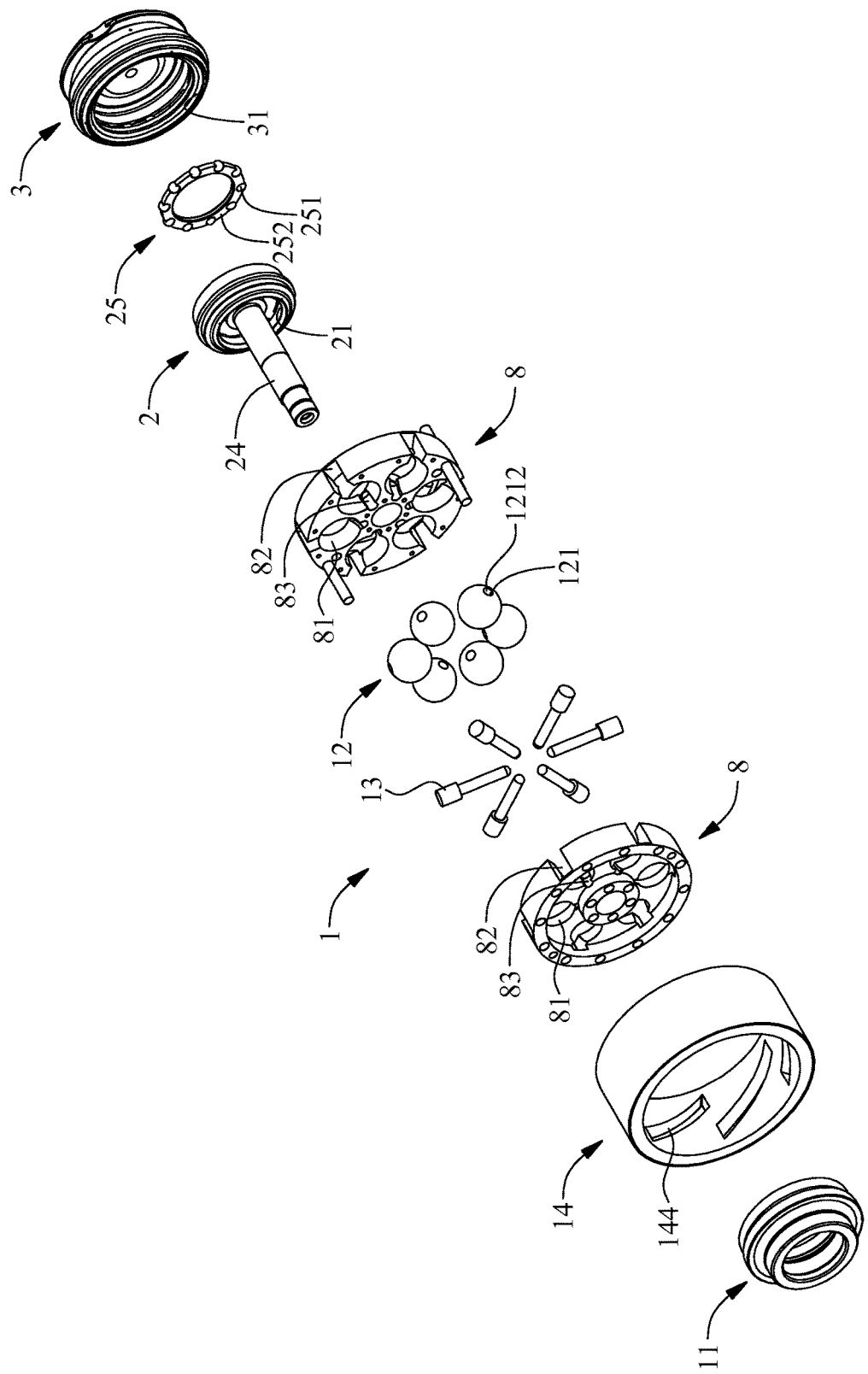
FIG. 6 is an exploded view of another axial power input rotator, gear shift unit and axial power output rotator according to a preferred embodiment of the present invention.
Figure 8:
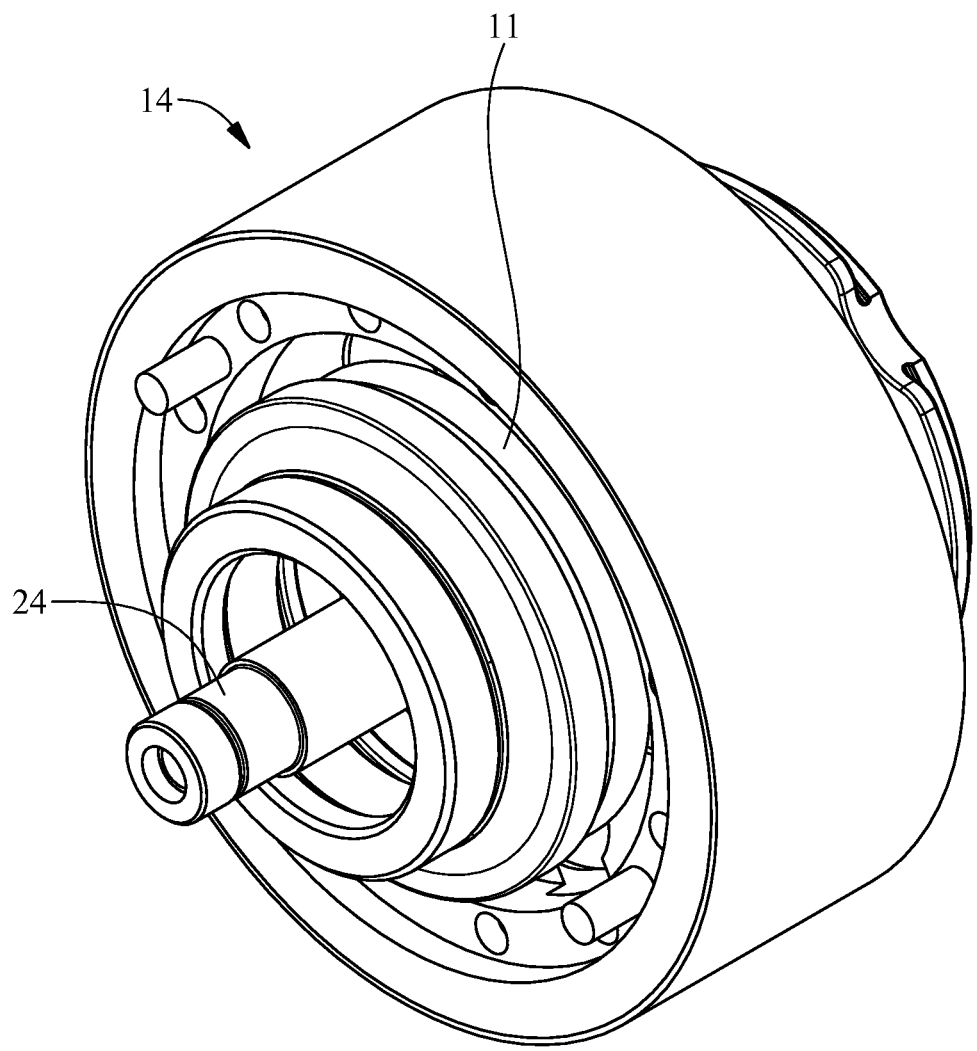
FIG. 8 is an assembled schematic view of another axial power input rotator, gear shift unit and axial power output rotator according to a preferred embodiment of the present invention.
Figure 9:
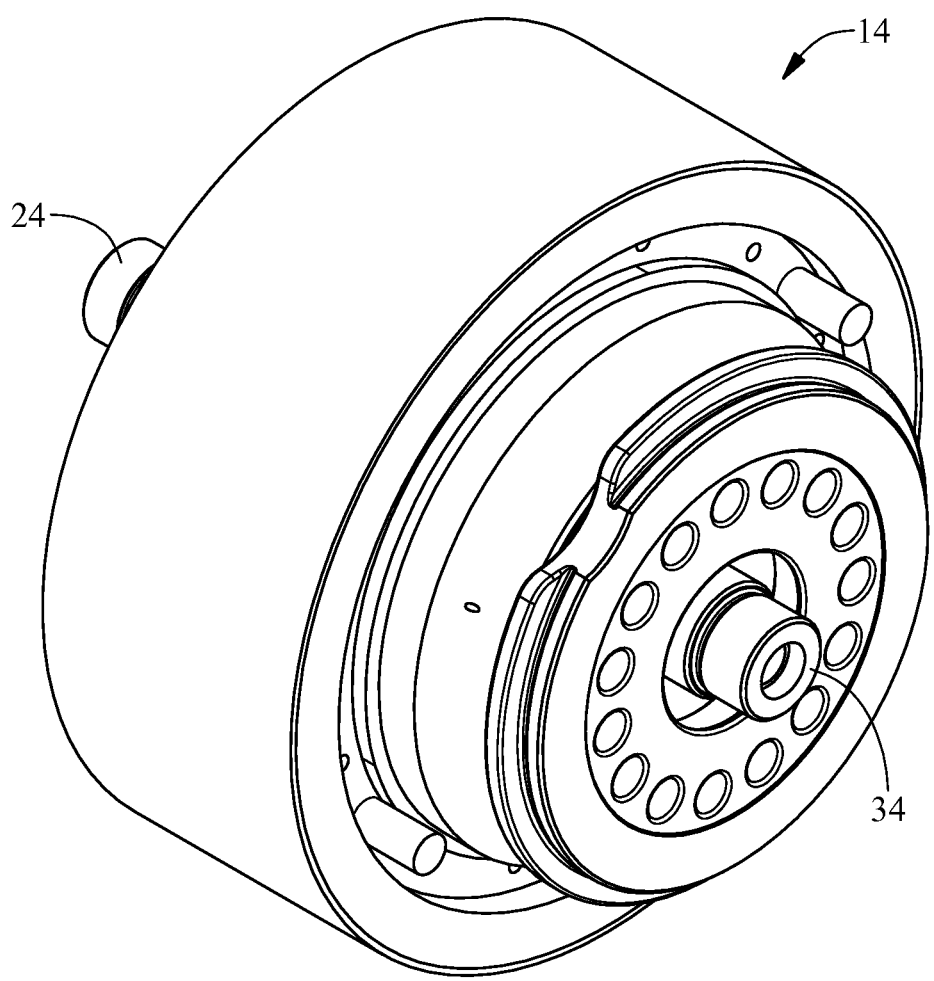
FIG. 9 is an assembled schematic view of another axial power input rotator, gear shift unit and axial power output rotator according to a preferred embodiment of the present invention from another angle of view.

Referring to FIG. 1, FIG. 6 and FIG. 8, the axial power input rotator, gear shift unit and axial power output rotator of FIG. 1 are equivalent to another axial power input rotator, gear shift unit and axial power output rotator of FIG. 6 and FIG. 8, respectively, whereas the axial power input bevel gear 22 of FIG. 1 is equivalent to the axial power input shaft 24 of FIG. 6 and FIG. 8. Treading the tread-required transverse power source 4 clockwise and thus rotating the axial power input rotator 2 clockwise causes the transmission balls 12 to be driven by the inward-tilted power input annular surface 21 of the axial power input rotator 2 to rotate clockwise and causes the inward-tilted power output annular surface 31 of the axial power output rotator 3 and the axial power output rotator 3 to be driven by the transmission balls 12 to rotate clockwise. Treading the tread-required transverse power source 4 counterclockwise and thus rotating the axial power input rotator 2 counterclockwise causes the transmission balls 12 to be driven by the inward-tilted power input annular surface 21 of the axial power input rotator 2 to rotate counterclockwise and causes the inward-tilted power output annular surface 31 of the axial power output rotator 3 and the axial power output rotator 3 to be driven by the transmission balls 12 to rotate counterclockwise.

Referring to the middle diagram through the leftmost diagram of FIG. 5, when the driving posts 13 rotate counterclockwise along the radial direction of the support rotator 11, the transmission balls 12 not only turn about the driving posts 13 but also rotate counterclockwise on the outer circumferential surface of the support rotator 11 along the radial direction of the support rotator 11; meanwhile, the inward-tilted power input annular surface 21 of the axial power input rotator 2 comes into contact with the large circumference of the transmission balls 12, and the inward-tilted power output annular surface 31 of the axial power output rotator 3 comes into contact with the small circumference of the transmission balls 12, thereby allowing the axial power input rotator 2 to be of a higher speed than the axial power output rotator 3. Hence, the linear gear shift mechanism of the present invention effectuates a labor-saving tread and deceleration whenever the driving posts 13 rotate counterclockwise along the radial direction of the support rotator 11. Referring to the middle diagram through the rightmost diagram of FIG. 5, when the driving posts 13 rotate clockwise along the radial direction of the support rotator 11, the transmission balls 12 not only turn about the driving posts 13 but also rotate clockwise on the outer circumferential surface of the support rotator 11 along the radial direction of the support rotator 11; meanwhile, the inward-tilted power input annular surface 21 of the axial power input rotator 2 comes into contact with the small circumference of the transmission balls 12, and the inward-tilted power output annular surface 31 of the axial power output rotator 3 comes into contact with the large circumference of the transmission balls 12, thereby allowing the axial power input rotator 2 to be of a lower speed than the axial power output rotator 3. Hence, the linear gear shift mechanism of the present invention effectuates a labor-consuming tread and acceleration whenever the driving posts 13 rotate clockwise along the radial direction of the support rotator 11. The operation of a driving post 13 and a transmission ball 12 is described above. The other driving posts and transmission balls also operate in the aforesaid manner.

Referring to the middle diagram through the leftmost diagram of FIG. 10, when the driving posts 13 rotate counterclockwise along the radial direction of the support rotator 11, the transmission balls 12 not only turn about the driving posts 13 but also rotate counterclockwise on the lateral annular surface 112 of the support rotator 11 along the radial direction of the support rotator 11; meanwhile, the inward-tilted power input annular surface 21 of the axial power input rotator 2 comes into contact with the large circumference of the transmission balls 12, and the inward-tilted power output annular surface 31 of the axial power output rotator 3 comes into contact with the small circumference of the transmission balls 12, thereby allowing the axial power input rotator 2 to be of a higher speed than the axial power output rotator 3. Hence, the linear gear shift mechanism of the present invention effectuates a labor-saving tread and deceleration whenever the driving posts 13 rotate counterclockwise along the radial direction of the support rotator 11. Referring to the middle diagram through the rightmost diagram of FIG. 10, when the driving posts 13 rotate clockwise along the radial direction of the support rotator 11, the transmission balls 12 not only turn about the driving posts 13 but also rotate clockwise on the lateral annular surface 112 of the support rotator 11 along the radial direction of the support rotator 11; meanwhile, the inward-tilted power input annular surface 21 of the axial power input rotator 2 comes into contact with the small circumference of the transmission balls 12, and the inward-tilted power output annular surface 31 of the axial power output rotator 3 comes into contact with the large circumference of the transmission balls 12, thereby allowing the axial power input rotator 2 to be of a lower speed than the axial power output rotator 3. Hence, the linear gear shift mechanism of the present invention effectuates a labor-consuming tread and acceleration whenever the driving posts 13 rotate clockwise along the radial direction of the support rotator 11. The operation of a driving post 13 and a transmission ball 12 is described above. The other driving posts and transmission balls also operate in the aforesaid manner.

Referring to FIG. 5, the larger the distance between the axial power input rotator 2 and the axial power output rotator 3, the larger the angle by which the driving posts 13 can rotate along the radial direction of the support rotator 11. Hence, the linear gear shift mechanism of the present invention is not only structurally simple and compact but also has a wide linear gear-changing range. Furthermore, to enable the linear gear shift mechanism of the present invention to change gear efficiently, the transmission balls 12 come into contact with the inward-tilted power input annular surface 21, the inward-tilted power output annular surface 31 and the outer circumferential surface of the support rotator 11 smoothly. Therefore, the linear gear shift mechanism of the present invention incurs little transmission loss and never jerks while shifting gear.

Referring to FIG. 10, the larger the distance between the axial power input rotator 2, the axial power output rotator 3 and the support rotator 11, the larger the angle by which the driving posts 13 can rotate along the radial direction of the support rotator 11. Hence, the linear gear shift mechanism of the present invention is not only structurally simple and compact but also has a wide linear gear-changing range. Furthermore, to enable the linear gear shift mechanism of the present invention to change gear efficiently, the transmission balls 12 come into contact with the inward-tilted power input annular surface 21, the inward-tilted power output annular surface 31 and the lateral annular surface 112 of the support rotator 11 smoothly. Therefore, the linear gear shift mechanism of the present invention incurs little transmission loss and never jerks while shifting gear.

Referring to FIG. 1, FIG. 2 and FIG. 11 through FIG. 15, the linear gear shift mechanism for chainless vehicles further comprises an auxiliary power source 7 which meshes with the tread-required transverse power source 4, so as for the auxiliary the tread-required transverse power source 4 to supply additional auxiliary power. Therefore, according to the present invention, the linear gear shift mechanism for chainless vehicles saves labor through the use of the auxiliary power source 7. Furthermore, the aforesaid technique also applies to another axial power input rotator, gear shift unit and axial power output rotator shown in FIG. 6 through FIG. 10.

Referring to FIG. 1, FIG. 2 and FIG. 11 through FIG. 15, regarding the linear gear shift mechanism for chainless vehicles, the auxiliary power source 7 has an auxiliary motor 71 and a battery 72. The auxiliary motor 71 has an auxiliary power bevel gear 711. The battery 72 and the auxiliary motor 71 are connected in series. The tread-required transverse power source 4 has a crankshaft 41 and a transverse power bevel gear 42. The crankshaft 41 penetrates and connects with the transverse power bevel gear 42. Each of the two ends of the crankshaft 41 is connected to a pedal crank (not shown). The auxiliary power bevel gear 711 meshes with the transverse power bevel gear 42. Therefore, the auxiliary power source 7 is disposed in the radial direction of the tread-required transverse power source 4. Furthermore, the aforesaid technique also applies to another axial power input rotator, gear shift unit and axial power output rotator shown in FIG. 6 through FIG. 10.

Figure 14:
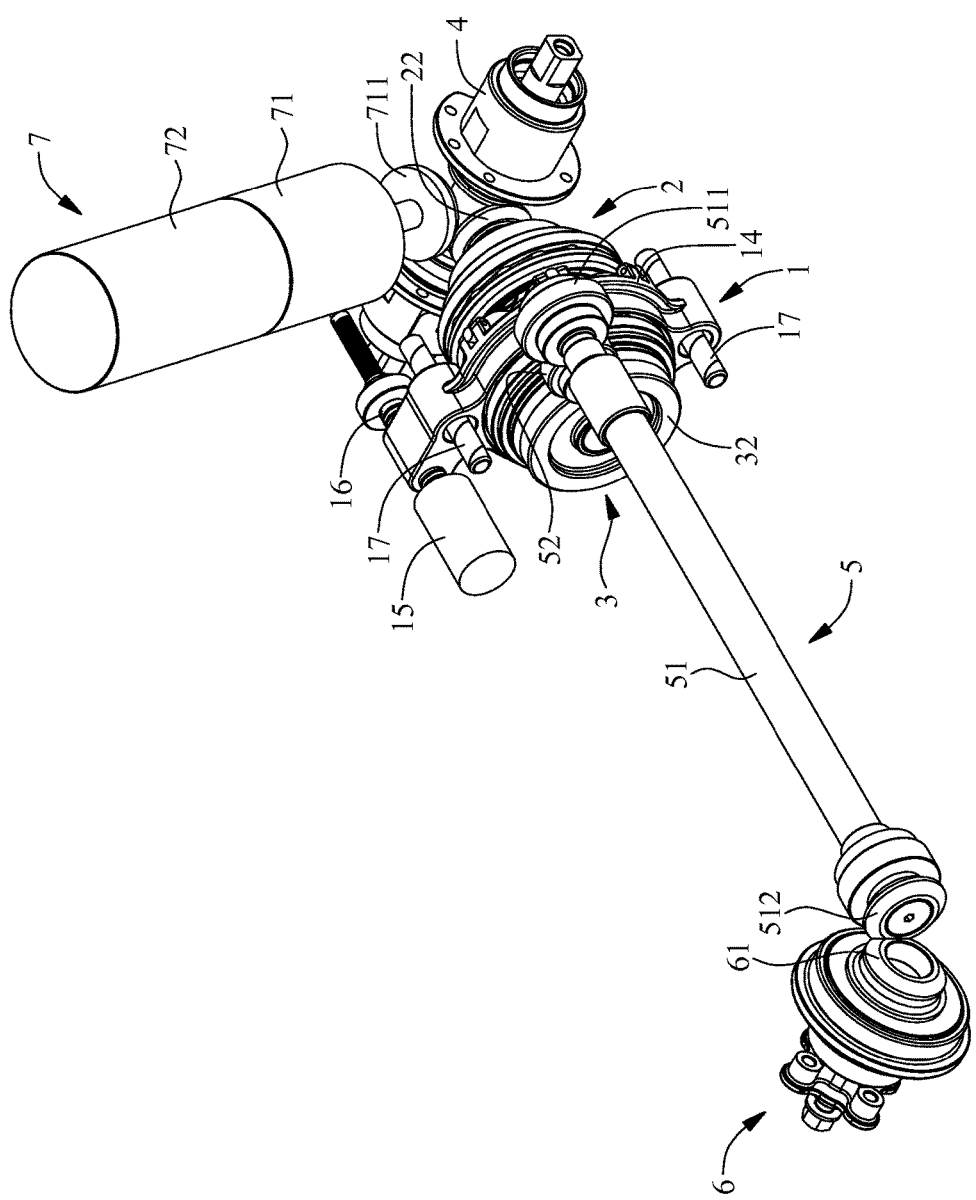
FIG. 14 is an assembled schematic view of a preferred embodiment of the present invention from yet another angle of view.
Figure 15:
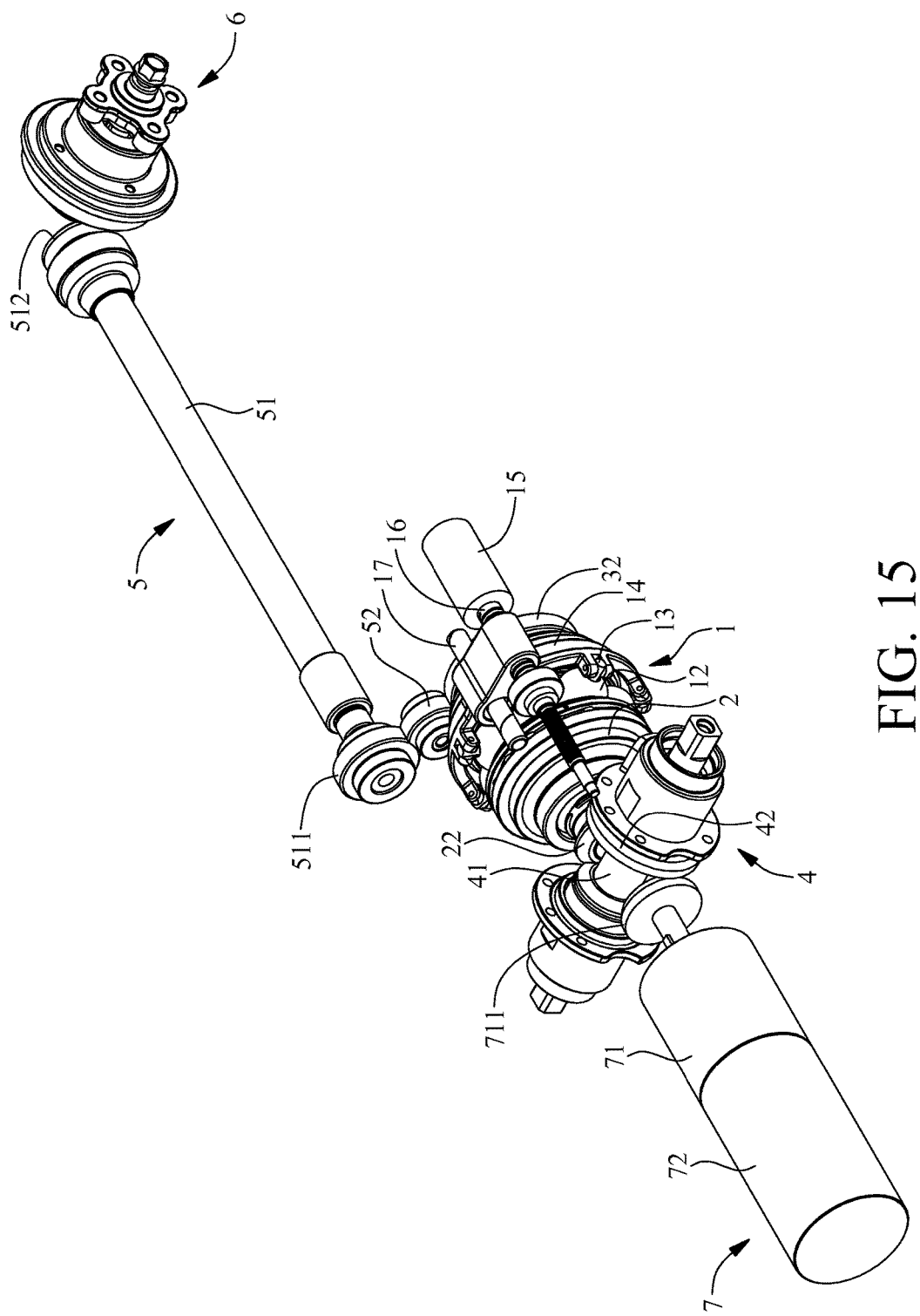
FIG. 15 is a schematic view of an auxiliary power source horizontally disposed according to a preferred embodiment of the present invention.

Referring to FIG. 1 through FIG. 3 and FIG. 11 through FIG. 15, regarding the linear gear shift mechanism for chainless vehicles, the auxiliary power source 7 is disposed in the radial direction of the support rotator 11, or the auxiliary power source 7 is disposed in the axial direction of the support rotator 11 (shown in FIG. 3 and FIG. 15). Therefore, the auxiliary power source 7 is coupled to the chassis of a chainless vehicle according to the chassis structure of the chainless vehicle. Furthermore, the aforesaid technique also applies to another axial power input rotator, gear shift unit and axial power output rotator shown in FIG. 6 through FIG. 10.

Referring to FIG. 3 through FIG. 5, regarding the linear gear shift mechanism for chainless vehicles, the axial power input rotator 2 and the axial power output rotator 3 are disposed on the two opposite sides of the transmission balls 12 to movably clamp the transmission balls 12 between the inward-tilted power input annular surface 21, the inward-tilted power output annular surface 31 and the outer circumferential surface of the support rotator 11. The cylindrical receiving portion 121 is a cylindrical receiving recess 1211. The inward ends of the driving posts 13 are movably disposed in the cylindrical receiving recesses 1211, respectively, along the radial direction of the support rotator 11. The gear shift unit 1 has a driving ring 14. The outward ends of the driving posts 13 are exposed from the transmission balls 12, respectively, and pivotally connected to a pivotal slot 141 of the driving ring 14 through a pivotal shaft 132. The driving ring 14 moves along the axial direction of the support rotator 11, such that the driving ring 14 drives the driving posts 13 and the transmission balls 12 to rotate clockwise or rotate counterclockwise, thereby allowing the linear gear shift mechanism of the present invention to change gear.

Referring to FIG. 3 and FIG. 4, regarding the linear gear shift mechanism for chainless vehicles, the gear shift unit 1 has a driving screw 16 and at least one guiding rod 17. The driving screw 16 penetrates and meshes with a threaded hole 142 of the driving ring 14. The driving screw 14 is driven with a driving motor 15 to rotate, such that the driving ring 14 moves along the axial direction of the support rotator 11. The guiding rod 17 movably penetrates a guide hole 143 of the driving ring 14. The guiding rod 17 is a post. The guiding rod 17 is provided in the plural and arranged symmetrically, such that the driving ring 14 moves in a balanced manner while being driven by the driving screw 16 to undergo translation. A second oil-guiding groove 171 is disposed on the circumferential surface of the guiding rod 17, such that a lubricant can be disposed between the guiding rod 17 and the driving ring 14 to reduce transmission loss.

Figure 7:
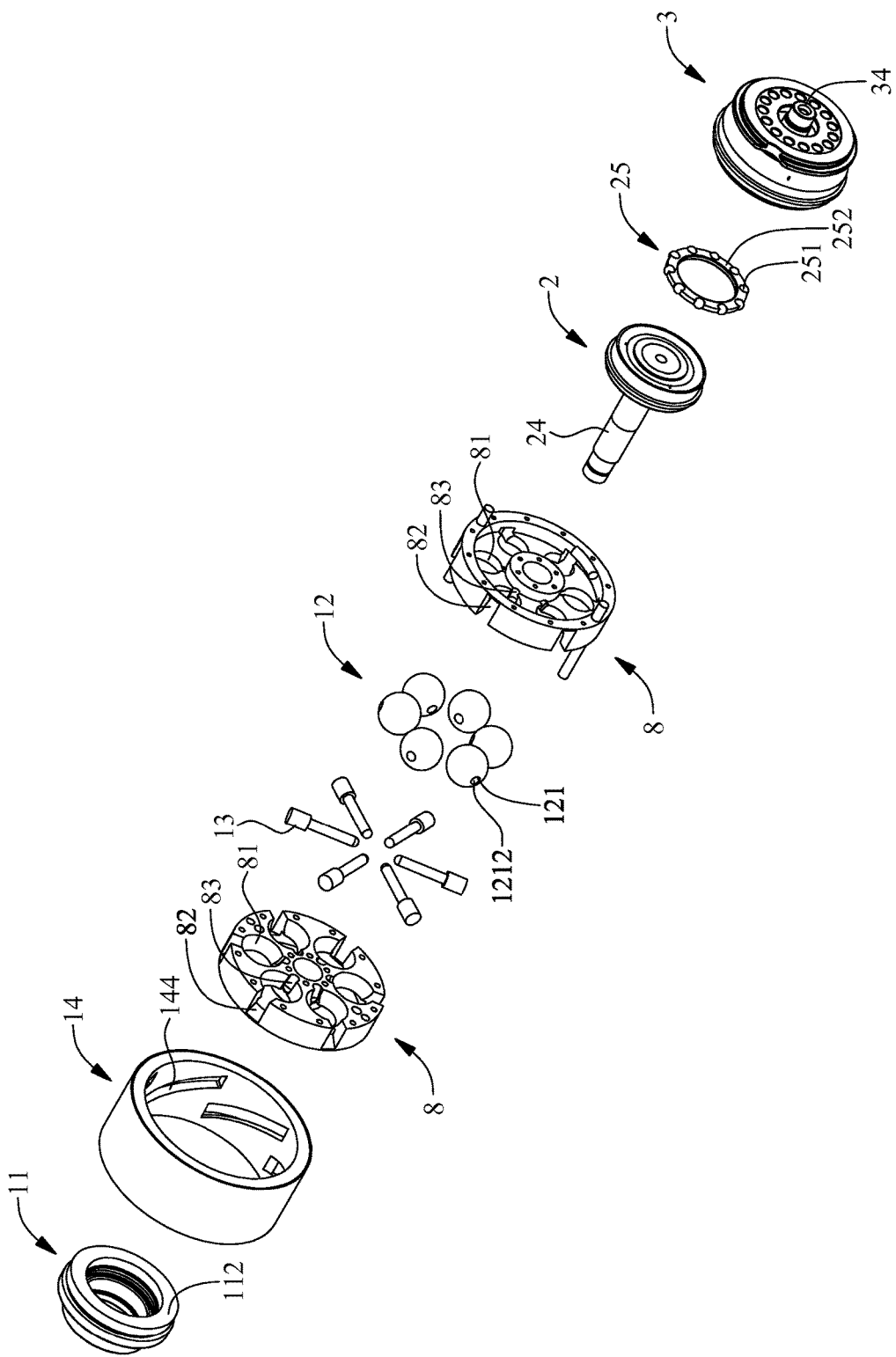
FIG. 7 is an exploded view of another axial power input rotator, gear shift unit and axial power output rotator according to a preferred embodiment of the present invention from another angle of view.

Referring to FIG. 6 through FIG. 10, regarding the linear gear shift mechanism for chainless vehicles, the gear shift unit 1 has a driving ring 14 and a limitator 8. As shown in FIG. 6 and FIG. 7, the limitator 8 is divided into halves, whereas the axial limiting through holes 81, the axial guide opening 82 and the axial curved guide slots 83 of the limitator 8 are each divided into halves. The inward annular surface of the driving ring 14 has a plurality of oblique guide slots 144. The limitator 8 has a plurality of axial limiting through holes 81 arranged in a manner to surround the axis of the support rotator 11. An axial guide opening 82 is disposed on the radial outward side of each axial limiting through hole 81. An axial curved guide slot 83 is disposed on the radial inward side of each axial limiting through hole 81. The driving ring 14 is movably disposed outside the limitator 8. The transmission balls 12 are movably confined to the axial limiting through holes 81, respectively. The two opposite sides of the transmission balls 12 are exposed from the two opposite sides of the axial limiting through holes 81. The cylindrical receiving portions 121 are each a cylindrical receiving channel 1212. The inward ends of the driving posts 13 movably penetrate the cylindrical receiving channels 1212 along the radial direction of support rotator 11 and thus are movably disposed in the axial curved guide slots 83, respectively. The outward ends of the driving posts 13 are movably disposed in the oblique guide slots 144 through the axial guide openings 82, respectively. The inward-tilted power input annular surface 21 of the axial power input rotator 2 is positioned inward to the inward-tilted power output annular surface 31 of the axial power output rotator 3, and both the axial power input rotator 2 and the axial power output rotator 3 are positioned on the same side of the transmission balls 12. The support rotator 11 is positioned beside the transmission balls 12 in a manner to be opposite to the axial power input rotator 2 and the axial power output rotator 3. Hence, the transmission balls 12 are movably clamped between the inward-tilted power input annular surface 21, the inward-tilted power output annular surface 31 and the lateral annular surface 112 of the support rotator 11. The driving ring 14 rotates about the limitator 8 by the axis of the support rotator 11. Since the two ends of each driving post 13 are guided by the axial guide opening 82 and the axial curved guide slot 83, respectively, the two ends of the driving post 13 can only move in the axial direction of the support rotator 11; afterward, when the driving ring 14 starts to rotate about the limitator 8, the outward ends of the driving posts 13 are guided to move rightward (as shown in the middle diagram through the leftmost diagram of FIG. 10) or leftward (as shown in the middle diagram through the rightmost diagram of FIG. 10) by the oblique guide slots 144 of the driving ring 14, so as to cause the driving posts 13 and the transmission balls 12 to simultaneously rotate counterclockwise (as shown in the middle diagram through the leftmost diagram of FIG. 10) or simultaneously rotate clockwise (as shown in the middle diagram through the rightmost diagram of FIG. 10), thereby enabling the linear gear shift mechanism for chainless vehicles to change gear. Furthermore, the linear gear shift mechanism for chainless vehicles further comprises a ball ring 25. The ball ring 25 has a plurality of balls 251 and a positioning ring 252. The balls 251 are spaced apart from each other and movably positioned in a plurality of positioning recesses of the positioning ring 252. The balls 251 are movably clamped between the axial power input rotator 2 and the axial power output rotator 3 to reduce the friction-induced loss incurred between the axial power input rotator 2 and the axial power output rotator 3.

Referring to FIG. 6, FIG. 7 and FIG. 10 as well as FIG. 3 through FIG. 5, regarding the linear gear shift mechanism for chainless vehicles, the gear shift unit 1 shown in FIG. 6, FIG. 7 and FIG. 10 can be identical to the gear shift unit 1 shown in FIG. 3 through FIG. 5 and thus has the driving ring 14 shown in FIG. 3 through FIG. 5. Similarly, the cylindrical receiving portions 121 shown in FIG. 6, FIG. 7 and FIG. 10 can be identical to the cylindrical receiving portions 121 shown in FIG. 3 through FIG. 5 and thus are each a cylindrical receiving recess 1211. The inward ends of the driving posts 13 are movably disposed in the cylindrical receiving recesses 1211, respectively, along the radial direction of the support rotator 11 shown in FIG. 6, FIG. 7 and FIG. 10. The outward ends of the driving posts 13 are pivotally connected to the driving ring 14. Referring to FIG. 6 through FIG. 10, the inward-tilted power input annular surface 21 of the axial power input rotator 2 is positioned inward to the inward-tilted power output annular surface 31 of the axial power output rotator 3, and both the axial power input rotator 2 and the axial power output rotator 3 are positioned on the same side of the transmission balls 12. The support rotator 11 is positioned beside the transmission balls 12 in a manner to be opposite to the axial power input rotator 2 and the axial power output rotator 3. Hence, the transmission balls 12 are movably clamped between the inward-tilted power input annular surface 21, the inward-tilted power output annular surface 31 and the lateral annular surface 112 of the support rotator 11. Like the driving ring 14 shown in FIG. 3 through FIG. 5, the driving ring 14 shown in FIG. 6, FIG. 7 and FIG. 10 moves along the axial direction of the support rotator 11 shown in FIG. 6, FIG. 7 and FIG. 10, thereby allowing the linear gear shift mechanism of the present invention to change gear. Similarly, the driving ring 14 shown in FIG. 6, FIG. 7 and FIG. 10 also operates in conjunction with the driving screw 16, driving motor 15 and guiding rod 17 shown in FIG. 3 and FIG. 4, such that the driving screw 16 drives the driving ring 14 to undergo translation along the axial direction of the guiding rod 17 and the support rotator 11.

Figure 2:
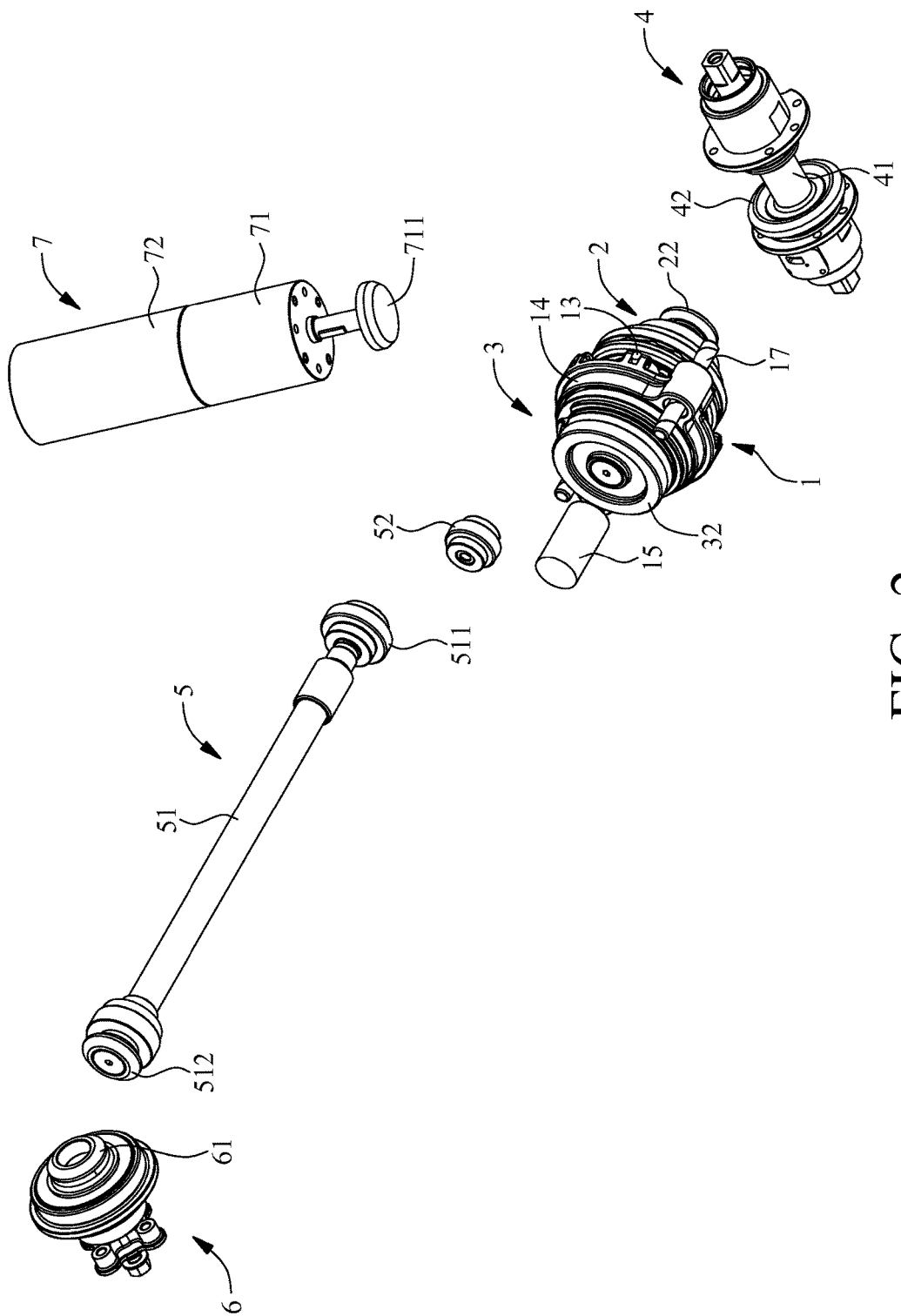
FIG. 2 is an exploded view of a preferred embodiment of the present invention from another angle of view.
Figure 12:
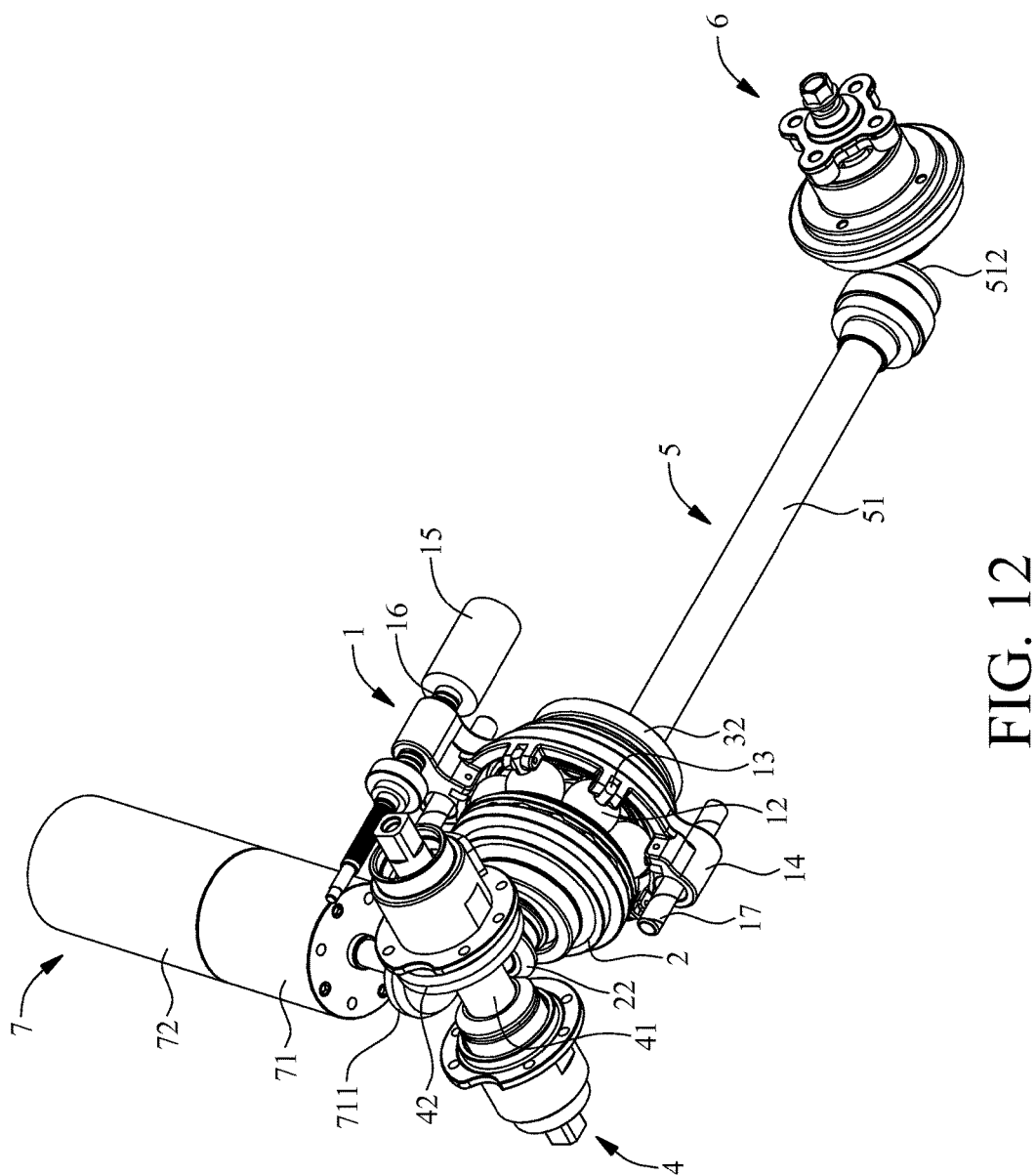
FIG. 12 is an assembled schematic view of a preferred embodiment of the present invention from another angle of view.
Figure 13:
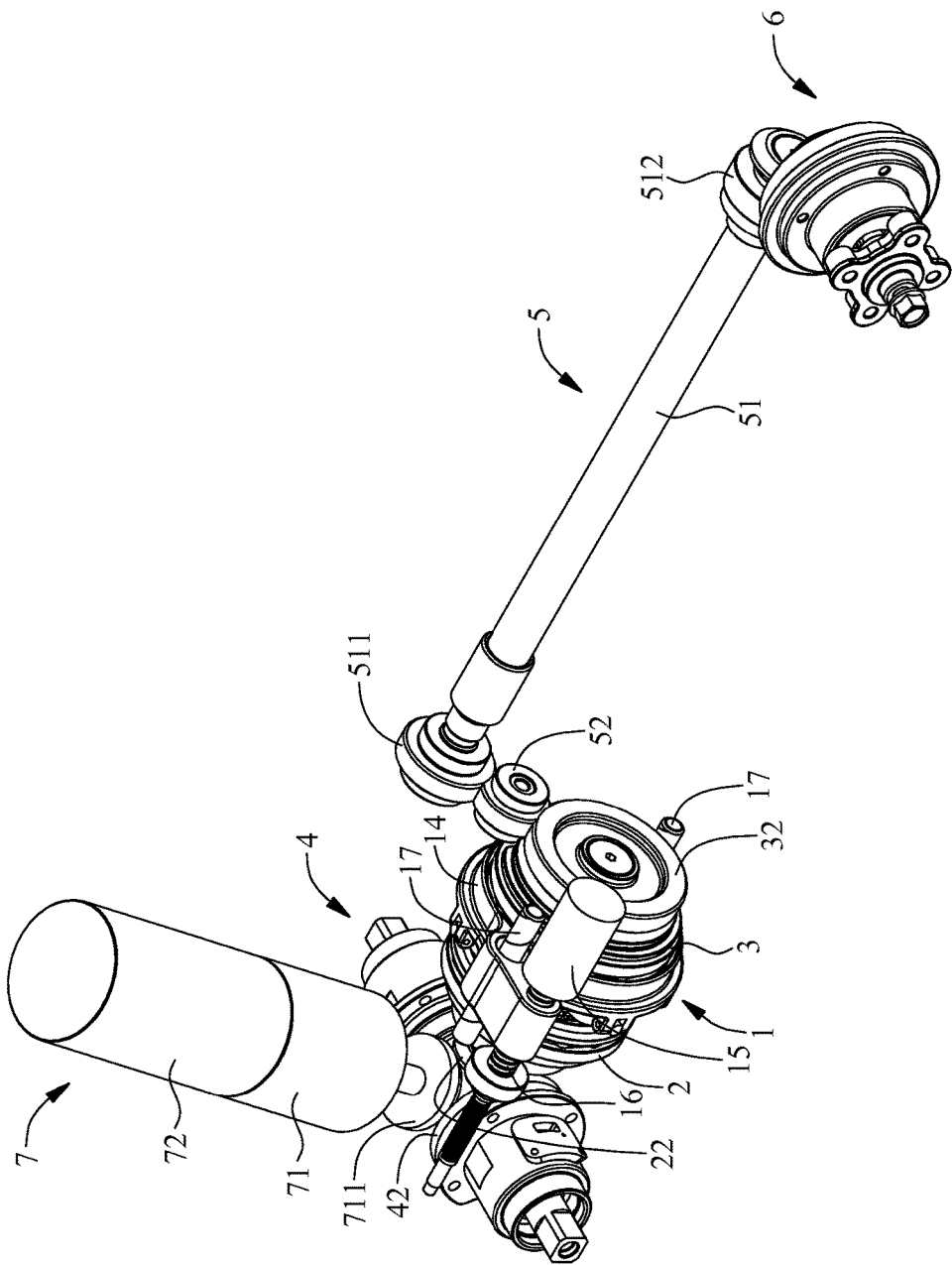
FIG. 13 is an assembled schematic view of a preferred embodiment of the present invention from yet another angle of view.

Referring to FIG. 1, FIG. 2 and FIG. 12, regarding the linear gear shift mechanism for chainless vehicles, the axial power input rotator 2 has an axial power input bevel gear 22, such that the transverse power bevel gear 42 of the tread-required transverse power source 4 meshes with the axial power input bevel gear 22. Therefore, the axial power input rotator 2, the gear shift unit 1 and the axial power output rotator 3 are arranged in the radial direction of the tread-required transverse power source 4. Furthermore, the aforesaid technique also applies to another axial power input rotator, gear shift unit and axial power output rotator shown in FIG. 6 through FIG. 10, and the axial power input bevel gear 22 is disposed at the axial power input shaft 24.

Referring to FIG. 1, FIG. 2, FIG. 13 and FIG. 14, regarding the linear gear shift mechanism for chainless vehicles, the axial power output rotator 3 has an axial power output spur gear 32, whereas the axial power transfer portion 5 has an axial power transfer spur gear 511 and a transmission shaft 51. The axial power transfer spur gear 511 is connected to one end of the transmission shaft 51. The axial power output spur gear 32 meshes with the axial power transfer spur gear 511. Therefore, power of the tread-required transverse power source 4 is transferred along the axial direction of the axial power output rotator 3. Furthermore, the aforesaid technique also applies to another axial power input rotator, gear shift unit and axial power output rotator shown in FIG. 6 through FIG. 10, and the axial power output spur gear 32 is disposed at the axial power output shaft 34.

Referring to FIG. 1, FIG. 2, FIG. 13 and FIG. 14, the linear gear shift mechanism for chainless vehicles further comprises a spur gear 52, such that the axial power output spur gear 32 meshes with the axial power transfer spur gear 511 through the spur gear 52. Therefore, the spur gear 52 enables the axial power output rotator 3 to change the direction in which a subsequent mechanism rotates. Furthermore, the aforesaid technique also applies to another axial power input rotator, gear shift unit and axial power output rotator shown in FIG. 6 through FIG. 10.

Referring to FIG. 2 and FIG. 14, regarding the linear gear shift mechanism for chainless vehicles, the transverse power output portion 6 has a transverse power output bevel gear 61. The transverse power output portion 6 can be connected to a wheel (not shown). The axial power transfer portion 5 has an axial power transfer bevel gear 512. The axial power transfer bevel gear 512 is connected to the other end of the transmission shaft 51. The transverse power output bevel gear 61 meshes with the axial power transfer bevel gear 512. Therefore, power of the axial power transfer portion 5 can be diverted and transferred to the transverse power output portion 6. Furthermore, the aforesaid technique also applies to another axial power input rotator, gear shift unit, and axial power output rotator shown in FIG. 6 through FIG. 10.

Figure 11:
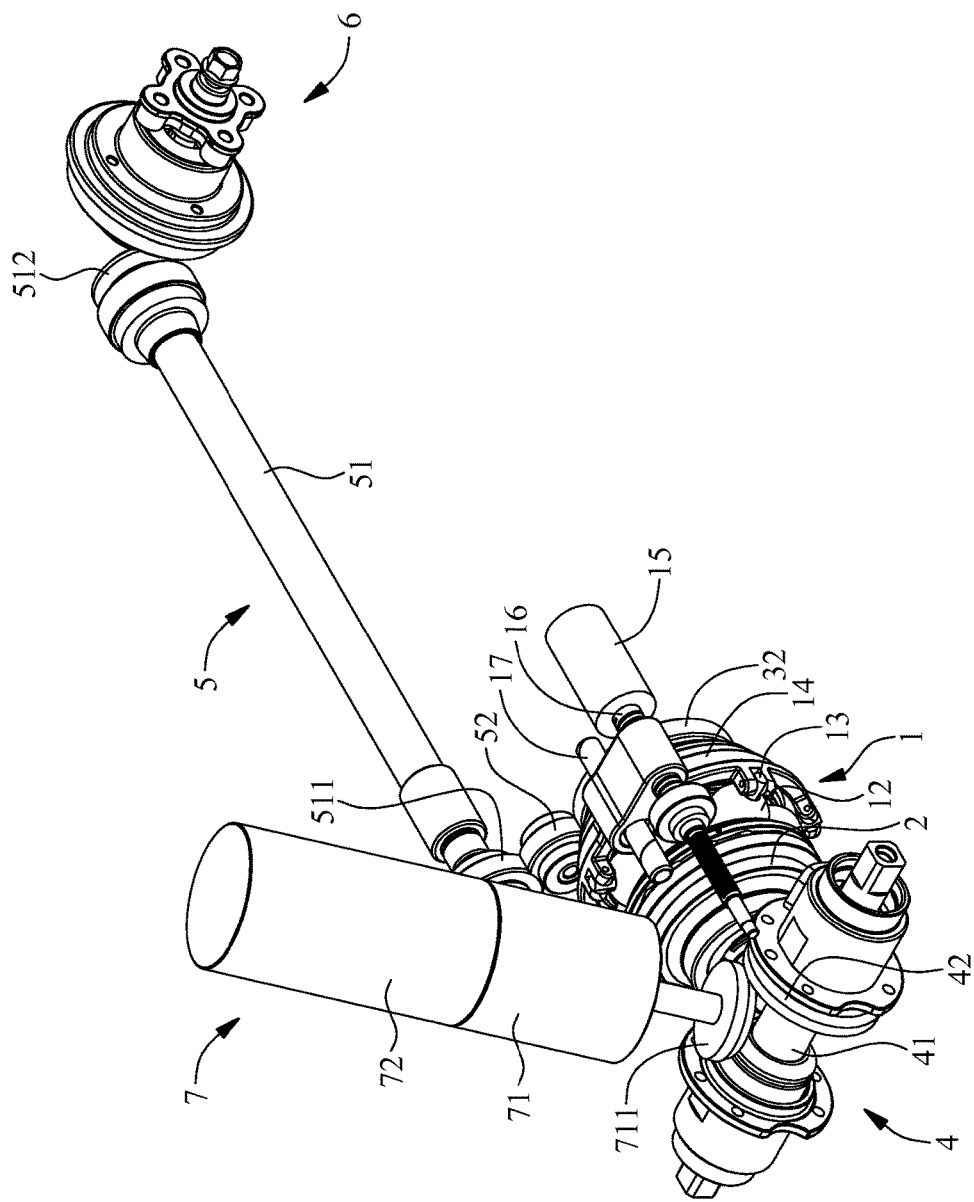
FIG. 11 is an assembled schematic view of a preferred embodiment of the present invention.

Referring to FIG. 1, FIG. 3 and FIG. 11, treading the tread-required transverse power source 4 clockwise and thus rotating the axial power input rotator 2 clockwise causes the transmission balls 12 to be driven by the inward-tilted power input annular surface 21 of the axial power input rotator 2 (shown in FIG. 4) to rotate counterclockwise and causes the inward-tilted power output annular surface 31 of the axial power output rotator 3, the axial power output rotator 3 and the axial power output spur gear 32 to be driven by the transmission balls 12 to rotate counterclockwise. Then, the axial power output spur gear 32 drives the spur gear 52 to rotate clockwise and drives the axial power transfer spur gear 511, the transmission shaft 51 and the axial power transfer bevel gear 512 to rotate counterclockwise. Eventually, the transverse power output bevel gear 61 of the transverse power output portion 6 is driven by the axial power transfer bevel gear 512 to rotate clockwise. Treading the tread-required transverse power source 4 counterclockwise and thus rotating the axial power input rotator 2 counterclockwise causes the transmission balls 12 to be driven by the inward-tilted power input annular surface 21 of the axial power input rotator 2 (shown in FIG. 4) to rotate clockwise and causes the inward-tilted power output annular surface 31 of the axial power output rotator 3, the axial power output rotator 3 and the axial power output spur gear 32 to be driven by the transmission balls 12 to rotate clockwise. Then, the axial power output spur gear 32 drives the spur gear 52 to rotate counterclockwise and drives the axial power transfer spur gear 511, the transmission shaft 51 and the axial power transfer bevel gear 512 to rotate clockwise. Eventually, the transverse power output bevel gear 61 of the transverse power output portion 6 is driven by the axial power transfer bevel gear 512 to rotate counterclockwise. Therefore, according to the present invention, the linear gear shift mechanism for chainless vehicles is characterized in that the transverse power output portion 6 rotates together with the tread-required transverse power source 4 in the same direction, thereby dispensing with any chain. Furthermore, since the axial power input shaft 24 of the gear shift unit 1 shown in FIG. 6 through FIG. 10 and the axial power output shaft 34 rotate in the same direction, the gear shift unit 1 shown in FIG. 6 through FIG. 10 enables the transverse power output portion 6 to rotate together with the tread-required transverse power source 4 in the same direction without any chain and the spur gear 52.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A linear gear shift mechanism for chainless vehicles, comprising:
    a gear shift unit having a support rotator, a plurality of transmission balls and a plurality of driving posts, with the transmission balls spaced apart from each other and movably disposed on the support rotator, with a cylindrical receiving portion disposed on each said transmission ball along a radial direction thereof, wherein the driving posts have inward ends movably disposed in the cylindrical receiving portions, respectively, along a radial direction of the support rotator and rotate from the radial direction of the support rotator to but not reach an axial direction of the support rotator;
    an axial power input rotator having an inward-tilted power input annular surface and inputting power along the axial direction of the support rotator;
    an axial power output rotator having an inward-tilted power output annular surface and outputting power along the axial direction of the support rotator, wherein the transmission balls are movably clamped between the inward-tilted power input annular surface, the inward-tilted power output annular surface and the support rotator;
    a transverse power source for meshing with the axial power input rotator along the radial direction of the support rotator;
    an axial power transfer portion for meshing with the axial power output rotator along the axial direction of the support rotator; and
    a transverse power output portion for meshing with the axial power transfer portion along the radial direction of the support rotator;
    wherein the axial power input rotator and the axial power output rotator are disposed on two opposite sides of the transmission balls, respectively, to movably clamp the transmission balls between the inward-tilted power input annular surface, the inward-tilted power output annular surface and an outer circumferential surface of the support rotator, with the cylindrical receiving portion being a cylindrical receiving recess, wherein the inward ends of the driving posts are movably disposed in the cylindrical receiving recesses, respectively, along the radial direction of the support rotator, wherein the gear shift unit has a driving ring, wherein outward ends of the driving posts are pivotally connected to the driving ring, and the driving ring moves along the axial direction of the support rotator.

2. The linear gear shift mechanism for chainless vehicles of claim 1, further comprising an auxiliary power source for meshing with the transverse power source.

3. The linear gear shift mechanism for chainless vehicles of claim 2, wherein the auxiliary power source has an auxiliary power bevel gear, and the transverse power source has a transverse power bevel gear, such that the auxiliary power bevel gear meshes with the transverse power bevel gear.

4. The linear gear shift mechanism for chainless vehicles of claim 2, wherein the auxiliary power source is disposed along one of the radial direction and the axial direction of the support rotator.

5. The linear gear shift mechanism for chainless vehicles of claim 1, wherein the gear shift unit has a driving screw for penetrating and meshing with the driving ring and at least a guiding rod for movably penetrating the driving ring.

6. The linear gear shift mechanism for chainless vehicles of claim 1, wherein the gear shift unit has a driving ring and a limitator, with a plurality of oblique guide slots disposed on an inward annular surface of the driving ring, wherein the limitator has a plurality of axial limiting through holes surrounding an axis of the support rotator, wherein an axial guide opening and an axial curved guide slot are disposed on a radial outward side and a radial inward side of each axial limiting through hole, respectively, wherein the driving ring is movably disposed outside the limitator, wherein the transmission balls are movably confined to the axial limiting through holes, respectively, wherein two opposite sides of the transmission balls are exposed from two opposite sides of the axial limiting through holes, wherein the cylindrical receiving portions are each a cylindrical receiving channel, wherein the inward ends of the driving posts movably penetrate the cylindrical receiving channels along the radial direction of the support rotator so as to be movably disposed in the axial curved guide slots, respectively, wherein the outward ends of the driving posts are movably disposed in the oblique guide slots through the axial guide openings, respectively, wherein the axial power input rotator and the axial power output rotator are positioned on a same side of the transmission balls, wherein the support rotator is positioned beside the transmission balls in a manner to be opposite to the axial power input rotator and the axial power output rotator, such that the transmission balls are movably clamped between the inward-tilted power input annular surface, the inward-tilted power output annular surface and a lateral annular surface of the support rotator, thereby allowing the driving ring to rotate about the limitator by the axis of the support rotator.

7. The linear gear shift mechanism for chainless vehicles of claim 1, wherein the gear shift unit has a driving ring, and the cylindrical receiving portions are each a cylindrical receiving recess, wherein the inward ends of the driving posts are movably disposed in the cylindrical receiving recesses, respectively, along the radial direction of the support rotator, wherein the outward ends of the driving posts are pivotally connected to the driving ring, wherein the axial power input rotator and the axial power output rotator are positioned on a same side of the transmission balls, wherein the support rotator is positioned beside the transmission balls in a manner to be opposite to the axial power input rotator and the axial power output rotator, such that the transmission balls are movably clamped between the inward-tilted power input annular surface, the inward-tilted power output annular surface and a lateral annular surface of the support rotator, thereby allowing the driving ring to move along the axial direction of the support rotator.

8. The linear gear shift mechanism for chainless vehicles of claim 1, wherein the transverse power source has a transverse power bevel gear, and the axial power input rotator has an axial power input bevel gear, such that the transverse power bevel gear meshes with the axial power input bevel gear.

9. The linear gear shift mechanism for chainless vehicles of claim 1, wherein the axial power output rotator has an axial power output spur gear, and the axial power transfer portion has an axial power transfer spur gear, such that the axial power output spur gear meshes with the axial power transfer spur gear.

10. The linear gear shift mechanism for chainless vehicles of claim 9, further comprising a spur gear whereby the axial power output spur gear meshes with the axial power transfer spur gear.

11. The linear gear shift mechanism for chainless vehicles of claim 1, wherein the transverse power output portion has a transverse power output bevel gear, and the axial power transfer portion has an axial power transfer bevel gear, such that the transverse power output bevel gear meshes with the axial power transfer bevel gear.

12. A linear gear shift mechanism for chainless vehicles, comprising:
 a gear shift unit having a support rotator, a plurality of transmission balls and a plurality of driving posts, with the transmission balls spaced apart from each other and movably disposed on the support rotator, with a cylindrical receiving portion disposed on each said transmission ball along a radial direction thereof, wherein the driving posts have inward ends movably disposed in the cylindrical receiving portions, respectively, along a radial direction of the support rotator and rotate from the radial direction of the support rotator to but not reach an axial direction of the support rotator;
 an axial power input rotator having an inward-tilted power input annular surface and inputting power along the axial direction of the support rotator;
 an axial power output rotator having an inward-tilted power output annular surface and outputting power along the axial direction of the support rotator, wherein the transmission balls are movably clamped between the inward-tilted power input annular surface, the inward-tilted power output annular surface and the support rotator;
 a transverse power source for meshing with the axial power input rotator along the radial direction of the support rotator;
 an axial power transfer portion for meshing with the axial power output rotator along the axial direction of the support rotator; and
 a transverse power output portion for meshing with the axial power transfer portion along the radial direction of the support rotator;

wherein the gear shift unit has a driving ring and a limitator, with a plurality of oblique guide slots disposed on an inward annular surface of the driving ring, wherein the limitator has a plurality of axial limiting through holes surrounding an axis of the support rotator, wherein an axial guide opening and an axial curved guide slot are disposed on a radial outward side and a radial inward side of each axial limiting through hole, respectively, wherein the driving ring is movably disposed outside the limitator, wherein the transmission balls are movably confined to the axial limiting through holes, respectively, wherein two opposite sides of the transmission balls are exposed from two opposite sides of the axial limiting through holes, wherein the cylindrical receiving portions are each a cylindrical receiving channel, wherein the inward ends of the driving posts movably penetrate the cylindrical receiving channels along the radial direction of the support rotator so as to be movably disposed in the axial curved guide slots, respectively, wherein the outward ends of the driving posts are movably disposed in the oblique guide slots through the axial guide openings, respectively, wherein the axial power input rotator and the axial power output rotator are positioned on a same side of the transmission balls, wherein the support rotator is positioned beside the transmission balls in a manner to be opposite to the axial power input rotator and the axial power output rotator, such that the transmission balls are movably clamped between the inward-tilted power input annular surface, the inward-tilted power output annular surface and a lateral annular surface of the support rotator, thereby allowing the driving ring to rotate about the limitator by the axis of the support rotator.

13. A linear gear shift mechanism for chainless vehicles, comprising:
a gear shift unit having a support rotator, a plurality of transmission balls and a plurality of driving posts, with the transmission balls spaced apart from each other and movably disposed on the support rotator, with a cylindrical receiving portion disposed on each said transmission ball along a radial direction thereof, wherein the driving posts have inward ends movably disposed in the cylindrical receiving portions, respectively, along a radial direction of the support rotator and rotate from the radial direction of the support rotator to but not reach an axial direction of the support rotator;
an axial power input rotator having an inward-tilted power input annular surface and inputting power along the axial direction of the support rotator;
an axial power output rotator having an inward-tilted power output annular surface and outputting power along the axial direction of the support rotator, wherein the transmission balls are movably clamped between the inward-tilted power input annular surface, the inward-tilted power output annular surface and the support rotator;
a transverse power source for meshing with the axial power input rotator along the radial direction of the support rotator;
an axial power transfer portion for meshing with the axial power output rotator along the axial direction of the support rotator; and
a transverse power output portion for meshing with the axial power transfer portion along the radial direction of the support rotator;
wherein the gear shift unit has a driving ring, and the cylindrical receiving portions are each a cylindrical receiving recess, wherein the inward ends of the driving posts are movably disposed in the cylindrical receiving recesses, respectively, along the radial direction of the support rotator, wherein the outward ends of the driving posts are pivotally connected to the driving ring, wherein the axial power input rotator and the axial power output rotator are positioned on a same side of the transmission balls, wherein the support rotator is positioned beside the transmission balls in a manner to be opposite to the axial power input rotator and the axial power output rotator, such that the transmission balls are movably clamped between the inward-tilted power input annular surface, the inward-tilted power output annular surface and a lateral annular surface of the support rotator, thereby allowing the driving ring to move along the axial direction of the support rotator.

* * * * *